US009288275B2

(12) United States Patent
Jain et al.

(10) Patent No.: US 9,288,275 B2
(45) Date of Patent: Mar. 15, 2016

(54) COMPUTER IMPLEMENTED EVENT-CENTRIC SOCIAL NETWORKING PLATFORM

(71) Applicant: ThistleWorks, Ossining, NY (US)

(72) Inventors: Rohit Jain, Chhattisgarh (IN); Nitinchandra Nayak, Ossining, NY (US)

(73) Assignee: THISTLEWORKS, Ossining, NY (US)

( * ) Notice: Subject to any disclaimer, the term of this patent is extended or adjusted under 35 U.S.C. 154(b) by 219 days.

(21) Appl. No.: 14/050,423

(22) Filed: Oct. 10, 2013

(65) Prior Publication Data

US 2014/0108333 A1   Apr. 17, 2014

Related U.S. Application Data

(60) Provisional application No. 61/712,409, filed on Oct. 11, 2012.

(51) Int. Cl.
*G06F 17/30* (2006.01)
*H04L 29/08* (2006.01)
*G06Q 50/00* (2012.01)

(52) U.S. Cl.
CPC ........... *H04L 67/22* (2013.01); *G06Q 50/01* (2013.01); *G06F 17/30* (2013.01)

(58) Field of Classification Search
None
See application file for complete search history.

(56) References Cited

U.S. PATENT DOCUMENTS

| 8,605,094 | B1* | 12/2013 | Alfaro et al. | 345/440 |
| 2007/0156636 | A1* | 7/2007 | Norton et al. | 707/1 |
| 2008/0132251 | A1* | 6/2008 | Altman et al. | 455/457 |
| 2012/0290977 | A1* | 11/2012 | Devecka | 715/810 |
| 2012/0323938 | A1* | 12/2012 | Skeen et al. | 707/754 |
| 2013/0179802 | A1* | 7/2013 | Martinazzi et al. | 715/753 |

* cited by examiner

*Primary Examiner* — Hung Q Pham

(57) ABSTRACT

A computer-implemented event-centric social networking platform and a method for implementing the event-centric social networking platform have been disclosed. The platform creates shared experiences, primarily amongst friends local to a particular region. The platform includes a first repository, a second repository and a third repository. The platform includes an analytic engine for analyzing users' behavioral information and identify corresponding behavioral patterns. The platform includes a recommendation module configured to generate a plurality of recommendations corresponding to the catalog offerings based on user behavioral patterns, user interests related information and user preference information. The platform further includes an event planning module for enabling the users of the platform to organize/plan events around the available catalog offerings, and invite their respective friends, other users, shortlisted based on pre-defined criteria, to be a part of the planned event and share comments, images, and social media related to the event with their friends.

47 Claims, 5 Drawing Sheets

COMPUTER IMPLEMENTED EVENT-CENTRIC SOCIAL NETWORKING PLATFORM

CROSS-REFERENCE TO RELATED APPLICATIONS

This application claims priority from U.S. Provisional Application Ser. No. 61/712,409, filed on Oct. 11, 2012, which is hereby incorporated by reference in its entirety.

STATEMENT REGARDING FEDERALLY SPONSORED RESEARCH OR DEVELOPMENT

Not Applicable.

FIELD OF THE DISCLOSURE

The present disclosure relates to the field of online event planning. More particularly, it relates to social networking based event planning platforms.

DEFINITIONS OF TERMS USED IN THE SPECIFICATION

The expression 'user' used hereinafter in the specification refers to but is not limited to a user registered with the event-centric social networking platform by submitting user's credentials in a predefined registration form and manages his/her user profile information. The term 'user' represents administrator, registered user, registered vendor, authorized user and anonymous user.

The expression "catalog offering" used hereinafter in the specification includes but is not limited to vendor offerings defined by registered vendors and user-defined offerings around which user events are planned.

The expression 'registered vendor' used hereinafter in the specification refers to a user who manages his/her business profile information and offers a plurality of services in the form of vendor offerings on the platform.

The expression 'friend/affiliate' used hereinafter in the specification refers to but is not limited to a user of the social networking platform who has accepted a friend request of another user and has been listed as a friend in the friend list of a registered user.

These definitions are in addition to those expressed in the art.

BACKGROUND

Internet-based social networking systems have become increasingly popular and have played an important role in bringing friends and family closer despite vast geographic distances by helping create online social networks and allowing friends to share information with one another in various forms including text, images, videos, music, applications and the like. People can now participate in conversations with friends and family across the globe, express their views, share ideas, images, and the like, thanks to the availability of social networking websites. Such social networking sites can also be described as user-centric social networks because the shared information is focused on the user. Although user-centric social networking systems have been extremely useful in bringing people closer across the globe, they have been less effective in bringing neighbors and friends within local communities closer to each other. Local communities have the advantage that friends and neighbors are located within travelling distances and so getting together in person for face-to-face meetings and social events is feasible. There are several existing online and offline solutions that work reasonably well in certain situations and allow users to setup meetings with one another. For example, online meet-up groups allow people with common interests to meet one another at a pre-specified venue and time schedule and socialize with one another. However, this model does not expect that attendees have existing friendships, and although it works efficiently for organizing meetings of people with a shared interest, it does not provide the social intimacy that people desire when meeting friends and neighbors.

There are other social networking models for setting up face-to-face meetings that involve sending invitations for interesting events to friends which can easily update users' online calendars. However, while using such models one has to be aware of friends' interests to improve the odds that the friend would find an invitation meaningful and accept it. Other systems make users aware of the physical location of friends so one can invite nearby friends for a social get-together on a short notice. These models primarily assume that a friend being physically in the neighborhood would readily accept an invitation to attend an event, without necessarily taking into account the friend's interests. Other mechanisms allow users to broadcast an invitation to friends who may share interests without taking into account the availability of these friends for the event. Most of the social networking platforms enable users to create social networks that may be heavy on long distance friendships which are really not suitable for local, in-person social interactions. This usually tends to be the case with people who are working and have to move to different parts of the world and have a preponderance of friends from their school and college, who are globally located.

OBJECTS

Some of the objects of the present disclosure aimed to ameliorate one or more problems of the prior art or to at least provide a useful alternative are described herein below:

An object of the present disclosure is to provide an event centric social networking platform.

An object of the present disclosure is to provide a platform for sharing event related content with users and users registered with other third party resources.

An object of the present disclosure is to provide a platform that enables users to manage events on a calendar.

An object of the present disclosure is to provide a platform that generates recommendations for catalog offerings based on users' interests.

An object of the present disclosure is to provide a platform that generates analytics on users' behavior on the platform.

An object of the present disclosure is to provide a platform to facilitate vendors and other users to submit catalog offerings.

An object of the present disclosure is to provide a platform that searches for catalog offerings based on event related information.

An object of the present disclosure is to provide a social networking platform that includes a revenue model.

SUMMARY

The present disclosure envisages an event-centric computer-implemented social networking platform. The social networking platform, in accordance with the present disclosure comprises:

a first repository configured to store at least user related information;

a second repository configured to store at least the information corresponding to the catalog offerings;

a third repository configured to store at least the event-related information corresponding to the users, information corresponding to resources uploaded onto the social networking platform by the users, information corresponding to access privileges and action permissions granted to various user roles;

an event planning module accessible to the users and configured to:
  receive a request from a user towards organizing an event based on at least one of the catalog offerings/catalog offering related activities, the request including at least event related information;
  search the second repository for catalog offerings related to the event related information;
  a first selection module configured to enable selection of at least one catalog offering, from the list;
  an updating module cooperating with the third repository, the updating module configured to update the event-related information stored in the third repository;
  a second search module cooperating with the first repository and third repository, the second search module configured to search the friend list for users interested and available to participate in activities associated with the event, the second search module configured to categorize the users into pre-determined invitee categories;

an invitation module configured to generate an invitee list including user names selected from at least one of the invitee categories, the invitation module configured to selectively transmit an invitation inviting the users included in the invitee list, to attend the event, the invitation module further configured to track the responses of invited users; and a presentation module configured to display a list of event invitations including past events and the events planned for the future.

In accordance with the present disclosure, the first repository is configured to store user related information including at least registration information, user interests related information, user availability preference related information, users' behavioral patterns, user skill related information, user location information, a friend list having names of users who are affiliated to a particular user, and information corresponding to messages sent/received by said users to/from other users.

In accordance with the present disclosure, the second repository is configured to store the information related to the ratings allotted to said vendors/catalog offerings by said users, and information corresponding to the vendors/catalog offerings-related reviews/feedbacks generated by said users.

In accordance with the present disclosure, the third repository is configured to store event related information including at least the information corresponding to the events organized by users based on at least one of said catalog offerings and the custom events organized by said users independent of said catalog offerings.

In accordance with the present disclosure, the analytic engine is configured to analyze the offerings, ratings/feedbacks corresponding to said vendors.

In accordance with the present disclosure, the presentation module is configured to control users' access to said list of event invitations, provide users with selective access to the contents of the event invitations and enable said users to view contents of the event invitations, edit the event invitation, comment on the event invitation and add photos/social media files on to the event invitation.

In accordance with the present disclosure, the receiving module is further configured to:
  receive a request from a user towards organizing an event based on at least the free time schedule corresponding to the user, wherein the request includes at least event related information; and
  receive a request from a user towards organizing an event based on the availability of at least one friend thereof, wherein the request includes at least the event related information.

In accordance with the present disclosure, the first search module is configured to:
  search the friend list stored in the first repository and search the free/busy time schedule related information stored in the third repository, for friends interested and available for attending a planned event;
  search the friend list stored in the first repository for friends interested in attending a planned event; and
  search the free time and busy time schedule related information stored in the third repository to extract a free time schedule common to each of the users interested in attending a planned event.

In accordance with the present disclosure, the first selection module is further configured to:
  enable selection of a catalog offering based on the free time schedule common to each of the users interested in attending a planned event; and
  enable selection of a catalog offering based on the friends interested and available for attending a planned event.

In accordance with the present disclosure, the event planning module further comprises a calculator configured to calculate a probability score corresponding to each of the users included in the invitee list, wherein the probability score indicates the probability that each of the users included in the invitee list, would accept the event invitation if invited.

In accordance with the present disclosure, the invitation module is configured to enable registered user invitees (henceforth referred to as registered invitees) and non-registered user invitees (henceforth referred to as non-registered invitees) to be included in the invitee list, receive the invitation, and respond to the event invitation.

In accordance with the present disclosure, the platform further includes a notification module configured to generate notifications corresponding to the activities performed by users on the social networking platform. The notification module is further configured to transmit notifications to users included in the friend list associated with a user.

In accordance with the present disclosure, the platform further includes:
  an analytic engine cooperating with the first repository, second repository and third repository, the analytic engine configured to analyze the users' behavioral information in the third repository and identify behavioral patterns underlying users' behavioral information; and
  a recommendation module configured to generate a plurality of recommendations corresponding to the catalog offerings based on user behavioral patterns identified by the analytic engine and further based on user interests related information and user preference information stored in the first repository, the recommendation module configured to transmit the recommendations to the users.

In accordance with the present disclosure, the platform further comprises a calendar module accessible to each of the users, the calendar module having a plurality of instances of a calendar, wherein every user has access to at least one instance of the calendar module, the calendaring module cooperating with the third repository to receive event related information corresponding to each of the users, the calendar module configured to generate an event schedule corresponding to each of the users, and populate the calendar instances with the event schedule.

In accordance with the present disclosure, the calendar module is further configured to determine the free time/busy time corresponding to each of the users based on the event related information corresponding to each of the users.

In accordance with the present disclosure, the second search module cooperates with the calendar module, the second search module configured to search the instances of the calendaring module to identify the users free to attend an event planned by a user, the second search module still further configured to update the invitee list to indicate the names of users free to attend the event and to indicate the names of users not free to attend the event. In accordance with the present disclosure, the platform is configured to cooperate with third party applications including websites and newsletters to enable the users to generate a request for organizing an event via the third party applications.

In accordance with the present disclosure, the event planning modules comprises:
  a second selection module configured to enable a host user to select a user from the friend list for the purpose of planning an event, the second selection module cooperating with the calendar module to extract the appropriate free time schedule corresponding to the selected user(s), based on the event related information corresponding to the selected user(s); and
  a third search module cooperating with the second repository to search for catalog offerings including activity types supporting host user's interests, host user's free time, interests shared between the host user and selected user; and
  a third selection module configured to select at least one catalog offering based on the appropriate date and time schedule selected by the host user.

In accordance with the present disclosure, the invitation module cooperates with the event planning module to prepare an invitee list.

In accordance with the present disclosure, the platform further includes a classifier configured to classify the catalog offerings according to at least activity type, location, content, timing, vendor, popularity and cost.

In accordance with the present disclosure, the recommendation module is further adapted to grade the catalog offerings stored in the second repository based on the preference settings, behavioral information and interests of a user.

In accordance with the present disclosure, the platform includes an editor configured to enable users to edit their preferences including preferred time schedule for a plurality of activities including social activities and work-related activities, cost/budget associated with the activities, favorite catalog offerings corresponding to the activities, the editor configured to enable the users to set default values for social activity times and work-related activity times scheduled for the days of the week, on their respective instances of the calendar.

In accordance with the present disclosure, the event planning module is configured to enable the users to announce interest towards attending an event based on specific catalog offerings, one or more activity types associated with the catalog offerings, the event planning module further configured to notify other users present in the user's friend list of the announcement should the user wish to invite the announcer and other users to a planned event.

In accordance with the present disclosure, the event planning module is configured to enable the users to set preferences for friends from whom the users wish to receive event invitations in response to their announced interest, the event planning module configured to share the information with other users in the form of data feeds.

In accordance with the present disclosure, the invitation module is configured to transmit invitations using a plurality of mechanisms including SMS invitations, email invitations, invitation in the form of notifications to third party social networks, invitation in the form of notifications transmitted to user's social networking platform inbox, and invitation through real-time applications implemented on user's communication devices.

In accordance with the present disclosure, the calendar module is further configured to integrate multiple event-related information sources corresponding to a user, the calendar module further configured to generate an aggregated list comprising event-related information of multiple types and from multiple sources including social event related information and work related information, the calendar module further configured to display the aggregated list.

In accordance with the present disclosure, the event planning module is further configured to enable the users to communicate their interest and availability to attend an event hosted by a user included in the friend list, in the case that the user indicates that other users can request invitation to the event.

In accordance with the present disclosure, the invitation module is further configured to generate an open choice invitation with a limited number of choices provided to the invitees regarding catalog offerings and related time/date schedules.

In accordance with the present disclosure, the platform is configured to enable a user having appropriate access privileges and action permissions, to enter an event invitation on friends' calendar, the event invitation initially in a no-response state and configured to be changed into an accepted state, declined state or tentatively accepted state, by the invited friend(s).

In accordance with the present disclosure, the platform includes a privacy editor configured to enable users to edit their data privacy preferences in the form of access privileges and action permissions assigned to various user roles, in respect of at least users' registration information, user event related information and users' calendar related information.

In accordance with the present disclosure, the privacy editor is configured to assign access privileges and action permissions to a plurality of user roles including self, event host, event attendee, event invitee, friend of a user, public user and anonymous user.

In accordance with the present disclosure, the event planning module is configured to automatically generate event plans based on at least the available catalog offerings, user's friend list, preferences and interests of users and friends thereof, behavioral information corresponding to the users and friends thereof and free/busy time schedules extracted from the calendar instances of users and friends thereof.

The present disclosure envisages a computer-implemented method for implementing an event centric social networking platform. The method, in accordance with the present disclosure comprises the following steps:

storing, in a first repository, at least user related information including at least registration information, user interests related information, user availability preference related information including free time and busy time schedules, users' behavioral patterns, a friend list having names of users who are affiliated to a particular user, and information corresponding to messages sent/received by the users to/from other users;

storing, in a second repository, at least the information corresponding to the catalog offerings provided by vendors and other users, information related to the ratings allotted to the vendors/catalog offerings by the users, and information corresponding to the vendors/catalog offerings-related reviews/feedbacks generated by the users;

storing, in a third repository, at least the event-related information corresponding to the users, information corresponding to resources uploaded onto the social networking platform by the users, information corresponding to access privileges and action permissions granted to respective users, wherein the event related information includes at least the information corresponding to the events organized by users based on at least one of the catalog offerings and the custom events organized by the users independent of the catalog offerings;

receiving a request from a user towards organizing an event based on at least one of the catalog offering related activities, the request including at least event related information;

searching the second repository for catalog offerings related to the event related information, and generating a list of catalog offerings related to the event specified by the user based on the user related information;

enabling selection of at least one catalog offering, from the list;

updating the event-related information stored in the third repository;

searching the friend list for users interested in activities associated with the event, and categorizing the users into pre-determined invitee categories;

generating an invitee list including user names selected from at least one of the invitee categories, and selectively transmitting an invitation inviting the users included in the invitee list, to attend the event, and tracking the responses of invited users; and displaying a list of event invitations including past events and the events planned for the future, controlling user's access to the list of event invitations, and providing the users with selective access to the contents of the event invitations for the purpose of viewing, editing, commenting, adding images, and social media files.

In accordance with the present disclosure, the step of storing, in a first repository, at least user related information further includes the step of storing at least registration information, user interests related information, user skill related information, user location information, user availability preference related information, users' behavioral patterns, a friend list having names of users who are affiliated to a particular user, and information corresponding to messages sent/received by said users to/from other users.

In accordance with the present disclosure, the step of storing, in a second repository, at least the information corresponding to the catalog offerings provided by vendors and other users, further includes the step of storing the information related to the ratings allotted to said vendors/catalog offerings by said users, and information corresponding to the vendors/catalog offerings-related reviews/feedbacks generated by said users.

In accordance with the present disclosure, the step of storing, in a third repository, at least the event-related information corresponding to said users further includes the step of storing event related information including at least the information corresponding to the events organized by users based on at least one of said catalog offerings and the custom events organized by said users independent of said catalog offerings.

In accordance with the present disclosure, the step of analyzing, using an analytic engine, said users' behavioral information and identifying behavioral patterns underlying said users' behavioral information, further includes the step of analyzing the offerings, ratings/feedbacks corresponding to said vendors.

In accordance with the present disclosure, the step of displaying a list of event invitations including past events and the events planned for the future, further includes the step of controlling users' access to said list of event invitations, providing users with selective access to the contents of the event invitations and enabling said users to view the event invitation, edit the event invitation, comment on the event invitation and add photos/social media files on to the event invitation.

In accordance with the present disclosure, the step of receiving a request from a user towards organizing an event, further includes the following steps:
    receiving a request from a user towards organizing an event based on at least the free time schedule corresponding to the user, wherein the request includes at least event related information; and
    receiving a request from a user towards organizing an event based on the availability of at least one friend thereof, wherein the request includes at least the event related information.

In accordance with the present disclosure, the step of searching the second repository further includes the following steps:
    searching the friend list stored in the first repository for friends interested and available for attending a planned event;
    searching the friend list stored in the repository for friends interested in attending a planned event; and
    searching the free time and busy time schedule related information stored in the first repository to extract a free time schedule common to each of the users interested in attending a planned event.

In accordance with the present disclosure, the step of enabling selection of at least one catalog offering, from the list includes the following steps:
    enabling selection of a catalog offering based on the free time schedule common to each of the users interested in attending a planned event; and
    enabling selection of a catalog offering based on the friends interested and available for attending a planned event.

In accordance with the present disclosure, the method further includes the step of calculating a probability score corresponding to each of the users included in the invitee list, wherein the probability score indicates the probability that each of the users included in the invitee list would accept the event invitation if invited, and using the probability score as a guide to further edit the invitee list.

In accordance with the present disclosure, the step of selectively transmitting an invitation inviting the users included in the invitee list further includes the step of enabling registered invitees and non-registered invitees to be included in the invitee list, receive the invitation, and respond to the event invitation.

In accordance with the present disclosure, the method further includes the following steps:
provide every user with access to at least one instance of a calendar; and
receiving event related information corresponding to each of the users, and generating an event schedule corresponding to each of the users, and populating the calendar instance with the event schedule.

In accordance with the present disclosure, the method further includes the step of determining the free time/busy time corresponding to each of the users based on the event related information corresponding to each of the users.

In accordance with the present disclosure, the step of categorizing the users into pre-determined invitee categories further includes the following steps:
searching the instances of the calendar to identify the users free to attend an event planned by a user;
updating the invitee list to indicate the names of users interested and free to attend the event, the names of users interested but not available for attending the event, and the names of users available for attending but interest uncertain.

In accordance with the present disclosure, the method includes the step of generating notifications corresponding to at least the activities performed by the users on the social networking platform, and transmitting the notifications to at least one user whose name is included in the friend list associated with a user.

In accordance with the present disclosure, the method further includes the following steps:
analyzing, using an analytic engine, the users' behavioral information and identifying behavioral patterns underlying the users' behavioral information, and analyzing the offerings, ratings/feedbacks corresponding to the vendors;
generating a plurality of recommendations corresponding to the catalog offerings based on user behavioral patterns identified by the analytic engine and further based on user interests related information and user preference information stored in the first repository, and transmitting the recommendations to the users;

In accordance with the present disclosure, the method further includes the step of configuring the social networking platform to cooperate with third party applications including websites and newsletters to enable the users to generate a request for organizing an event via the third party applications.

In accordance with the present disclosure, the step of enabling selection of at least one catalog offering, from the list, further includes the following steps:
enabling a host user to select a user from the friend list for the purpose of planning an event, and extracting the appropriate free time schedule corresponding to the selected user(s), based on the event related information corresponding to the selected user(s);
searching for catalog offerings including activity types supporting host user's interests, host user's free time, interests shared between the host user and selected user; and
selecting at least one catalog offering based on the appropriate date and time schedule selected by the host user.

In accordance with the present disclosure, the step of storing, in a second repository, at least the information corresponding to the catalog offerings provided by vendors and other users includes the step of classifying the catalog offerings according to at least activity type, location, content, timing, vendor, popularity and cost.

In accordance with the present disclosure, the step of generating a plurality of recommendations further includes the step of grading the catalog offerings stored in the second repository based on the preference settings, behavioral patterns, and interests of users.

In accordance with the present disclosure, the method further includes the following steps:
enabling users to edit their preferences including preferred time schedule for a plurality of activities including social activities and work-related activities, cost/budget associated with the activities, favorite catalog offerings corresponding to the activities;
enabling the users to set default values for social activity times and work-related activity times scheduled for the days of the week, on their respective instances of the calendar.

In accordance with the present disclosure, the method further includes the following steps:
enabling the users to announce interest towards attending an event based on specific catalog offerings, one or more activity types associated with the catalog offerings; and
notifying other users present in the user's friend list of the announcement should the user wish to invite the announcer and other users to a planned event.

In accordance with the present disclosure, the method further includes the following steps:
enabling users to set preferences for friends from whom the users wish to receive event invitations in response to their announced interest; and
sharing the information with other users in the form of data feeds.

In accordance with the present disclosure, the step of selectively transmitting an invitation inviting the users included in the invitee list further includes the step of transmitting invitations using a plurality of mechanisms including SMS invitations, email invitations, invitation in the form of notifications to third party social networks, invitation in the form of notifications transmitted to user's social networking platform inbox, and invitation through real-time applications implemented on user's communication devices.

In accordance with the present disclosure, the step of providing every user with access to at least one instance of a calendar further includes the following steps:
integrating multiple event-related information sources corresponding to a user;
generating an aggregated list comprising event-related information of multiple types and from multiple sources including social event related information and work related information; and
displaying the aggregated list.
populating the calendar instance with the event-related information In accordance with the present disclosure, the method further includes the step of enabling the users to communicate their interest and availability to attend an event hosted by a user included in the friend list, in the case that the user indicates that other users can request invitation to the event.

In accordance with the present disclosure, the method further includes the step of generating an open choice invitation with a limited number of choices provided to the invitees regarding catalog offerings and related time/date schedules.

In accordance with the present disclosure, the method further includes the step of enabling a user having appropriate access privileges and action permissions to enter an event invitation on friends' calendar, the event invitation initially in a no-response state and configured to be subsequently changed into an accepted state, declined state or tentatively accepted state, by the invited friend(s).

In accordance with the present disclosure, the method further includes the step of enabling users to edit their data privacy preferences in the form of access privileges and action permissions assigned to various user roles, in respect of at least users' registration information, user event related information and users' calendar related information.

In accordance with the present disclosure, the method further includes the step of assigning access privileges and action permissions to a plurality of user roles including self, event host, event attendee, event invitee, friend of a user, public user and anonymous user.

In accordance with the present disclosure, the method further includes the step of automatically generating event plans based on at least the available catalog offerings, user's friend list, preferences and interests of users and friends thereof, behavioral patterns corresponding to the users and friends thereof and free/busy time schedules extracted from the calendar instances of users and friends thereof.

BRIEF DESCRIPTION OF THE ACCOMPANYING DRAWINGS

The computer implemented event centric social network platform of the present disclosure will now be explained in relation to the non-limiting accompanying drawings, in which.

DETAILED DESCRIPTION

Figure 1:
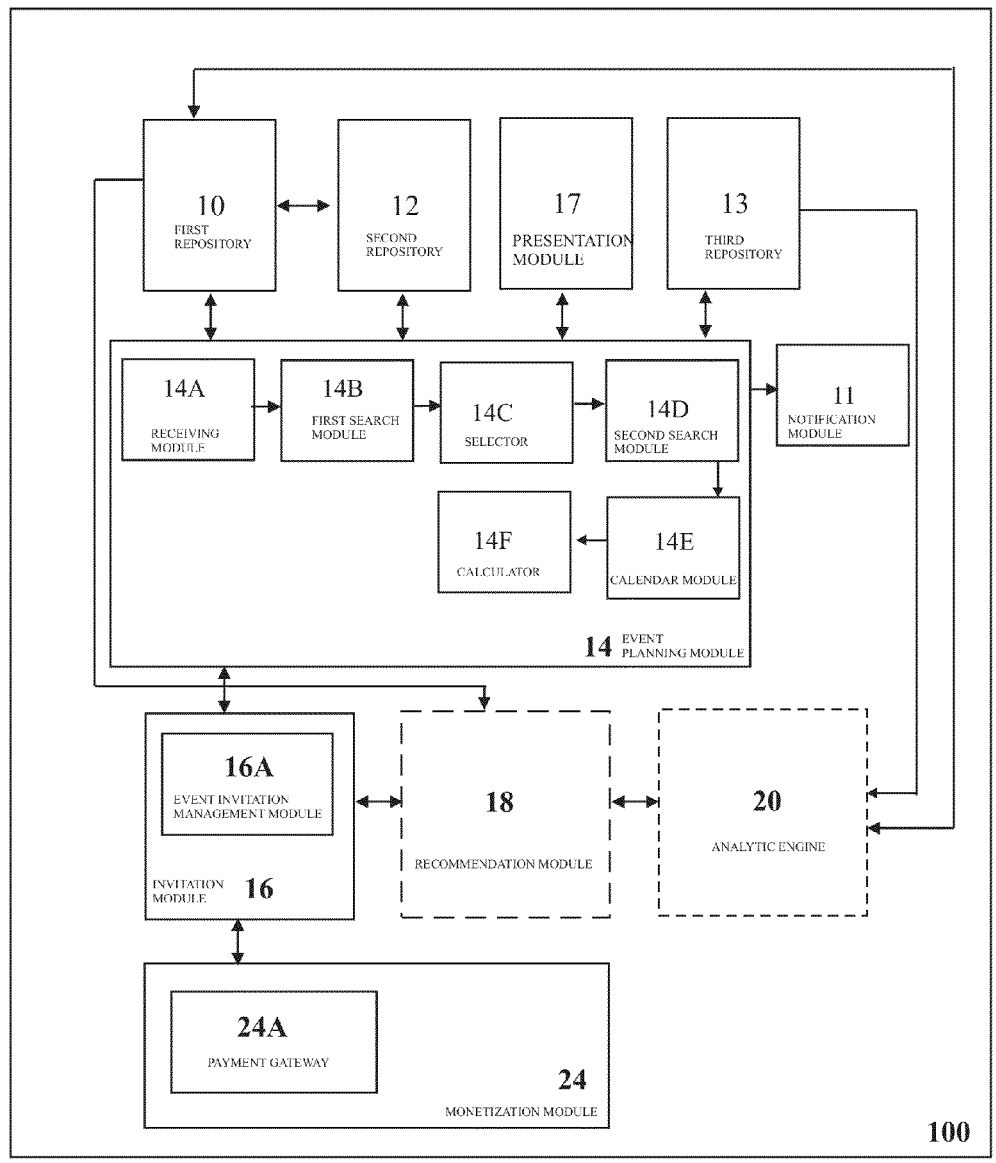
FIG. 1 illustrates a system-level block diagram of the components of an event-centric social networking platform.

The system and method for implementing an event centric social network platform will now be described with reference to the accompanying drawings, which do not restrict the scope and ambit of the present disclosure. The description is provided purely by the way of illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The event-centric social networking platform of the present disclosure, with its focus on the user's social event, event planning and social networking, attempts to remedy many of the shortcomings of the above models and improve face-to-face social networking amongst friends and neighbors within local communities. The event-centric social networking platform is based on the idea that (1) meaningful social interactions happen when friends meet face-to-face to participate in events in which they have a shared interest, (2) most people tend to be sensitive to rejection and consequently shy. So one can assume that conversely they will be socially more active when the probability is high that their social invitation would be accepted by invitees, (3) the probability of a user's invitation being accepted is higher when the invitee shares an interest in the event-related activity, the invitee is available to participate during the event time schedule, and the invitee's behavior with respect to previous invitations and event participation can be an indicator of whether the invitee will accept the invitation, and (4) most people enjoy sharing information about their social activities and happenings with friends who in turn enjoy learning about their friends' activities. The event-centric social networking platform addresses these requirements by integrating an event planning system, a catalog of vendor offerings to participate in, and a social networking platform with online user profiles and social relationships in order to promote offline interactions amongst friends based on shared interests in activities supported by offerings from local vendors at a convenient time schedule to the host and invitees. Additionally, users can communicate and collaborate with other invitees, friends, and public by posting comments, images, videos, music files on the event invitation document, which is accessible through the computer network and doubles as the social wall for the event.

The present disclosure envisages a computer implemented event-centric social networking platform which creates a shared experience amongst the users, typically mutual friends. The users of the event-centric social networking platform include individual users who have registered themselves with the social networking platform by creating a profile for themselves (referred to as 'registered users' hereafter) as well as the other non-registered users who are affiliated/connected/linked with one or more of the registered users. A shared experience is facilitated amongst friends, friends-of-friends, and other users through the event-centric social networking platform, when an event, typically a social event, is organized using the social networking platform. The social networking platform provides for event planning details, event execution details, comments, event related discussions, pre-event artifacts and post-event artifacts, the social media corresponding to the event and the like to be shared amongst the users and their respective affiliates (friends). The event-centric social networking platform, in accordance with the present disclosure, enables users and their respective affiliates to share social media in the context of organized events. The events organized using the event-centric social networking platform typically include dinner events, sport related events, social outings, get-togethers and user defined custom activities, for example backyard barbecue and game of bridge.

In accordance with the present disclosure, the aforementioned events are typically organized by registered users around services (also referred to as 'catalog offerings' hereinafter) provided by vendors and other users. The catalog offerings are utilized by registered users for the purposes of planning events. The event planning via the event-centric social networking platform takes into consideration preferences including the budget limits and preferred times for social activity, strength of the relationship between the host and his/her affiliates, and activities of interest of the host as well as host's affiliates.

Moreover, the event-centric social networking platform also takes into consideration various factors associated with the catalog offerings, including activities of interest supported by the offering, the location where the catalog offering is provided, corresponding opening hours/closing hours, availability of discount coupons and the like while formulating an event plan. The event-centric social networking platform of the present disclosure also enables users and their affiliates to upload event-related social media content to the event plan and share the same with a larger community of users having affiliations with the event host/attendees/invitees, either through the event centric social networking platform or through third party social networking platforms. The event centric social networking platform of the present disclosure also addresses the needs of the users who wish to be informed about the activities of their online affiliates and organized events/gatherings involving their respective affiliates.

FIG. 1 illustrates a first embodiment of the present disclosure. Referring to FIG. 1, there is shown a system-level block diagram illustrating the components of the event-centric social networking platform 100. The social networking platform 100, in accordance with the present disclosure is configured to group users of the social networking platform into at least five user roles namely, administrator, registered user, registered vendor, authorized user and anonymous user. In accordance with the present disclosure, an administrator supports platform administration functions and ensures proper implementation of the social networking platform. An administrator also ensures that appropriate data gathering, data sharing, and maintenance policies are implemented on the social networking platform. A registered user of the social networking platform is one who has registered with the social networking platform by creating at least a profile (in part or full) with the social networking platform. Only registered users have the privilege of creating event plans and inviting other users to the planned events using the event-centric social networking platform. A registered vendor is one who is registered with the social networking platform by creating a profile (in part or full) and providing information corresponding to the business and vendor offerings of the registered vendor. An authorized user is considered to be an unregistered user (non-member) who is identified as a friend of at least one registered user. An authorized user is allowed to access predetermined features of the social networking platform due to special privileges available to unregistered users. For example, an authorized user can respond to event invitations sent to them by registered users. An anonymous user is not registered with the social networking platform (non-member) and is also not identified as a friend of a registered user. An anonymous user is allowed to access some of the pre-determined features of the social networking platform due to special privileges available to anonymous users such as visitors from other social networking sites wanting to access event-related information on the event-centric social networking platform.

The platform 100, in accordance with the present disclosure includes a first repository denoted by the reference numeral 10. The repository 10 is configured to store at least information related to users. The information related to users includes but is not restricted to user's current location/home location, profile information, registration information, user interests related information, user skill related information, user location information, user preference related information, and user behavioral information. The user's home location mentioned in the profile description is considered as the user's current location by default by the platform 100. The repository 10 also stores a friend list corresponding to each user. The friend list is specific to a user and includes names of both registered users and authorized users (affiliates) with whom the particular registered user is connected via the social networking platform. The affiliates of the registered users are the friends who are not registered on the platform 100, but the concerned registered user wishes to identify such affiliates as authorized users in his/her friend list.

Figure 1A:
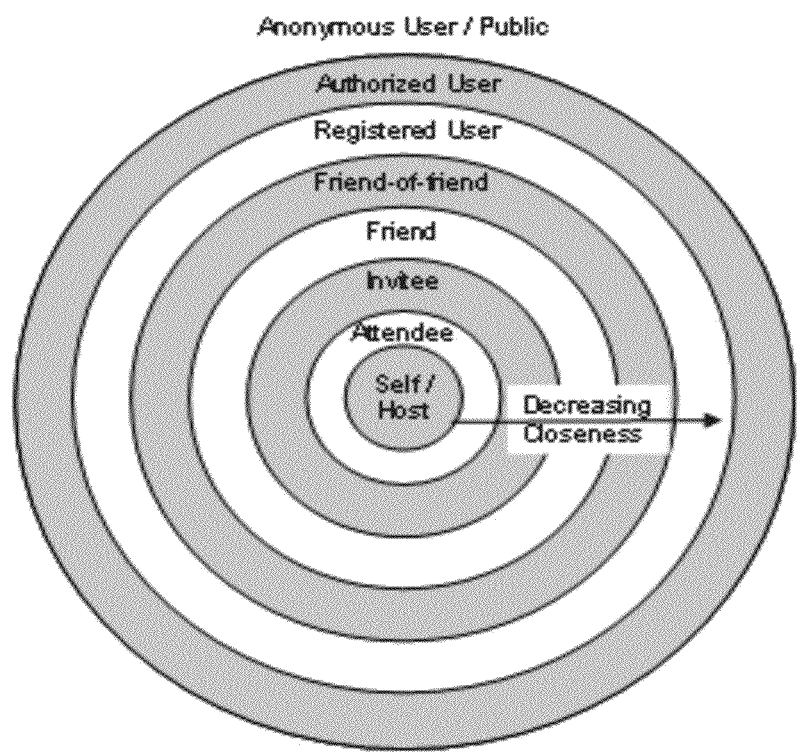
FIG. 1A illustrates a hierarchy of the access permissions and action privileges assigned to the resources uploaded on the social networking platform.

In accordance with the present disclosure, the platform 100 includes a creator (not shown in figures) cooperating with the first repository 10 and configured to create a plurality of subsets of the friend list stored in the first repository 10. The plurality of subsets created by the creator include the names extracted from the friend list of the user, according to a pre-determined criteria (including interest, relationship status and the like) specified by the user. The first repository 10 is further configured to store at least the registration information corresponding to users having registered themselves as 'vendors'. FIG. 1A of the accompanying drawings illustrates by way of an example, the hierarchy based on which the access permissions and action privileges are assigned to the platform's features and resources uploaded on the social networking platform. According to FIG. 1A, in the context of an event, a user can be designated as an event host or as an event attendee or as an event invitee, friend of the event host, friend of a friend, any registered user in the platform, authorized user, and anonymous user. The hierarchy depicted in FIG. 1A is arranged based on the decreasing order of closeness between a particular user and other user roles. A specific access privilege and action permission granted to users of the social networking platform with regards to system artifacts such as event invitations, user calendar, uploaded resources and other event related information is specified at the level of the user-designation that is farthest from the host who has this privilege and permission.

In accordance with FIG. 1A, for a particular event organized by a host, if any specific event access privileges and action permissions are granted to users designated as friend-of-friend, then all the other users who have a higher order of closeness with the host (attendee, invitee, and friend) will automatically inherit those event access privileges and action permissions. On the other hand, there can be multiple categories of access privileges and action permissions for the same artifact or uploaded resource. For example, an event-related uploaded resource may not be deleted and edited by an event invitee if he/she not owner of the resource. However, an event host, who always has the highest level of privileges in the context of the hosted event, is granted privileges to access, delete and edit the event-related resources uploaded by any user. Further, a system artifact or uploaded resource can have multiple sections and each section can have a different set of access privileges and action permissions. For example, a friend of a user with read access to event details of a specific event invitation is denied access to the same event's invitee list, which is a section of the event invitation. Further the access permissions and action privileges can be dynamically altered by the social networking platform. For example, in case of an event, if a friend of the event host is initially not granted access to any event details but an anonymous user with lower order of closeness to the host is granted access to the event details section related to social media, then the friend of the event host, with higher order of closeness to the host, is automatically upgraded to the access privileges and action permissions available to the anonymous user and allowed access to the event related social media section. In accordance with the present disclosure, a user hosting an event and having all the privileges and action permissions accorded to an event-host can confer identical privileges and action permissions to a plurality of other users.

In accordance with the present disclosure, the social networking platform 100 further includes a second repository denoted by the reference numeral 12. The repository 12 stores the information corresponding to catalog offerings that can be provided by registered consumer users, registered vendor users and the users who are in the capacity of the administrator role of the platform 100. The repository 12 also stores information related to reviews and ratings generated by users in respect of catalog offerings. The catalog offerings are classified in a variety of ways including by the user activity they support so they can be searched and displayed on the platform 100.

In accordance with the present disclosure, the catalog offering registration information includes information corresponding to the name of the offered service/product, activity type corresponding to the offering, description tags, location information, accepted payment types, service hours, contact information, corresponding business or service URL (Universal Resource Locator) and the like. In accordance with the present disclosure, catalog offerings are the services (for example, restaurant dining) offered by vendors and other users, around which a user creates his her social event plan. The social networking platform 100 enables a user to search for and filter the catalog offerings by activity of interest, cost, location and the like. The social networking platform 100 is also capable of extracting catalog offering related information from other relevant third party resources including websites, web-catalogues, web based advertisements and the like and integrate the same with the social networking platform.

In accordance with the present disclosure, a registered user can also create his own catalog offerings and such offerings and the corresponding details are also stored in the second repository 12. This includes vendor offerings added to the social networking platform 100, by a registered user on behalf of an nm-registered vendor.

The social networking platform 100 allows a user, typically a registered user to choose and edit a user-defined offering from a set of existing catalog offerings. The user is provided with access to all or part of the existing information corresponding to a selected catalog offering and is also provided with the option of editing any part of the existing information when granted appropriate edit permission. The social networking platform 100 also tracks the user who added/last edited a particular catalog offering, for purposes of traceability. Additionally, the social networking platform 100 also provides the status of the user who posted a catalog offering, thereby enabling other users to ascertain the authenticity of a catalog offering before selecting the same. The social networking platform 100 also provides a generic 'host-defined' offering, which can be used to create event plans wherein the actual offering details are specified by the host while creating the event plan. This is typically used to specify details of informal offerings such as backyard barbecue, social gatherings, and the like.

In accordance with the present disclosure, a catalog offering's availability date and time can be displayed in any of the well-known formats. For an infrequently provided catalog offering, a specific date and time could be mentioned and for a frequently/regularly provided catalog offering, a specific start date and time along with recurrence data and time can be displayed. The date and time information is typically used to determine whether a particular catalog offering is feasible for the users to attend. The social networking platform 100, in accordance with the present disclosure also provides for display of vendor advertisements. These advertisements can be directly uploaded onto the social networking platform 100 and are typically displayed on different screens of the social networking platform user interface or as a part of various data feeds/newsfeeds provided to the registered users. The same advertisements can also be displayed to other users of the social networking platform 100, in a context sensitive manner, to enhance the user experience and also improve the probability that users react to a particular advertisement.

In accordance with the present disclosure, the social networking platform 100 further includes a third repository denoted by the reference numeral 13. The third repository 13 which can be federated across several servers is configured to store at least the event related information corresponding to the users, information corresponding to resources uploaded onto the social networking platform by the users and corresponding access privileges/action permissions associated with various attributes of a specific event's event related information. The event related information includes all the information (including at least event planning related information and event request related information) corresponding to the events organized by users based on at least one of the catalog offerings and the custom host-defined offering events organized by the users independent of the catalog offerings. The third repository 13 also stores information (metadata) corresponding to the resources (including but not restricted to text files, image files, multimedia files) uploaded by users. The third repository 13 also stores access permissions and action privileges associated with resources uploaded by users.

In accordance with the present disclosure, the third repository 13 provides for the individual event plans (event related information containers) to be stored in a plurality of relationship arrangements including but not restricted to parent-child relationship and peer-to-peer relationship. Any change to a particular event plan (event related information) is uniformly reflected in the related event plans as well.

In accordance with the present disclosure, a relationship arrangement between two related event plans is uni-directional and the relationship attributes can be used to compute the access privileges and action permissions associated with event-related information within each of the related event plans.

In accordance with the present disclosure, the social networking platform 100 includes an event planning module denoted by the reference numeral 14. The event planning module can be implemented in a variety of ways including a series of decisions and as a multi-variable optimization problem based on host-specified objective function to select the event plan parameters. The event plan parameters include an event schedule, corresponding catalog offering, and invitees feasible in terms of both location and time and whose profiled interests and preferences may or may not be in agreement with the activity supported by the catalog offering. In the case of event planning by registered vendors for purposes of announcing a promotion event, many of the event plan parameters may be pre-selected (e.g. vendor offering, event schedule) and others computed on demand (e.g. list of users to be invited based on specific criteria).

Figure 1B:
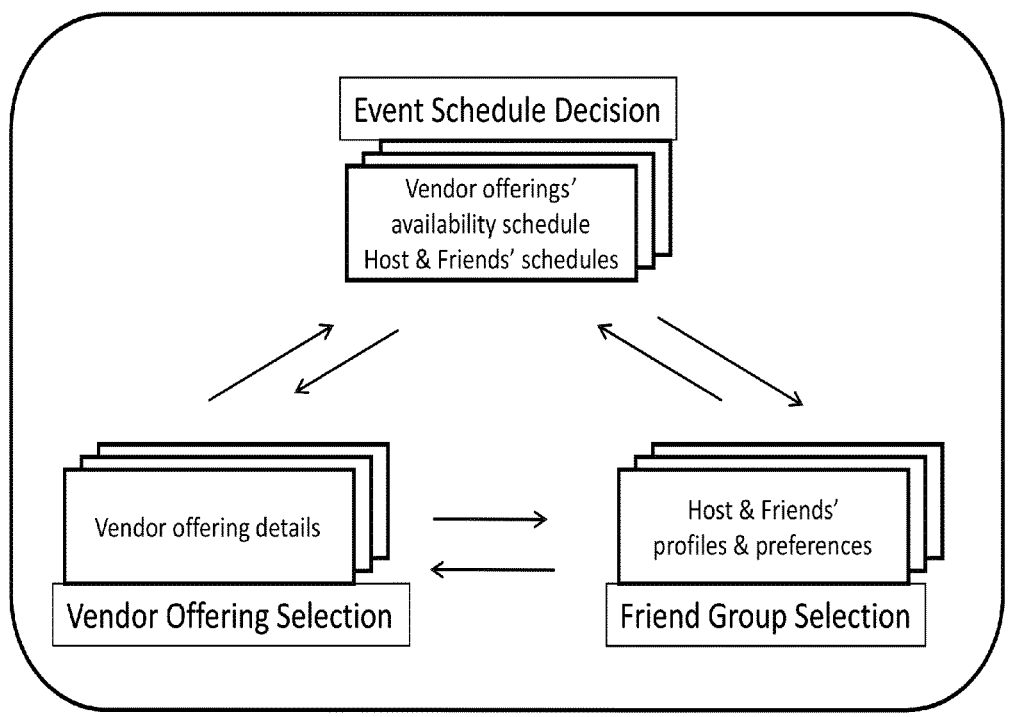
FIG. 1B is a flowchart illustrating the various elements which an event host has to access as part of event planning and the variety of possible element selection sequences.

Referring to FIG. 1B, several embodiments of event planning module based on a series of decisions, to select event plan parameters are possible depending on the sequence of decision steps. For example, the host may have some free time and therefore try to find out who amongst his friends is free to join him and then choose a catalog offering of interest to some or all the friends. In another embodiment, the host may be interested in socializing with a specific set of friends and then select who amongst these friends is available for the specified event schedule and then select available catalog offering that is of interest to some or all of the invitees. In yet another embodiment, the host is interested in a specific catalog offering and therefore decides which other friends to invite, based on shared interest in the offering and checks against friends' calendar availability.

Referring to FIG. 1 again, the event planning module 14, in accordance with the present disclosure includes a receiving module 14A configured to receive a request from a user (host) for organizing at least one event. The request received by the receiving module 14A can originate within the social networking platform 100 or from a networked third party application integrated with the social networking platform 100 and includes at least the event related information (partial or complete) including at least the catalog offering associated with event, date and time of the event, and location of the event.

In accordance with the present disclosure, the receiving module 14A is further configured to receive a request from a user towards organizing an event based on at least the free time schedule (stored in the third repository 13) corresponding to the requesting user. The receiving module 14A is further configured to receive a request from a user towards organizing an event based on the availability of at least one friend thereof.

The event planning module 14 further includes a first search module 14B cooperating with the repository 12 and configured to search the repository 12 for catalog offerings relevant to a registered user based on pre-defined criteria. The search module 14B analyzes at least the catalog offering name, location information, supported activity type, and date/time information corresponding to the catalog offerings stored in the repository 12 and compares the same against the event related information received by the receiving module 14A. The search module 14B can also compare the location information, supported activity type, and date/time information corresponding to the catalog offerings, with the user preference related information, user availability related information. The search module 14B further generates, on the basis of the comparison, a list of catalog offerings that are relevant to the purported event specified by the host. The catalog offerings list is typically arranged in descending order of relevance of the catalog offering to the event related information. The event planning module 14 further includes a selection module 14C accessible to the host and configured to enable the host to select at least one catalog offering from the list prepared by the search module 14B.

In accordance with the present disclosure, the search module 14B is further configured to search the friend list and the subsets associated with the friend list stored in the first repository 10 for friends of a requesting user (who generates a request for planning an event) based on pre-defined search criteria. The pre-determined search criteria can be derived using the information about user's interested and available to attend an event, users interested but not available to attend an event, users available but interest uncertain, user availability preference related information, users' behavioral patterns, user skill related information, user location information, the cost associated with the catalog offerings, the location of the catalog offering, the relative distance between user's and catalog offering's locations, date and time of the catalog offerings, user preference related information, user availability related information and the like.

The event planning module 14 further includes a selection module 14C configured to enable the host to select at least one catalog offering from the list prepared by the search module 14B. The selection module 14C, in accordance with the present disclosure is configured to enable selection of a catalog offering based on the free time schedule common to each of the users interested in attending a planned event. Further, the selection module 14C is also configured to enable selection of a catalog offering based on the names of the friends interested in and available for attending a planned event.

The event planning module 14 further includes a second search module 14D cooperating with repository 10. The search module 14D has access to the event related information embedded in the planning request received by receiving module 14A, including the name of the host. The search module 14D searches the friend list of the host (stored in repository 10) to identify other registered users who per their profile information have expressed interest in the activities associated with the planning request and/or to identify users who could be interested in the selected offering, based on their profile information. The search module 14D creates a invitee list based on at least the registered users' current location and the location of the catalog offering. The second search module 14D is further configured to search the friend list for users whose preference attributes such as cost, event start & end times and the like do not conflict with the parameters of event. i.e., the selected catalog offering. The search module 14D further updates the invitee list and categorizes the invitees into one or more groups based on specific criteria. For example, one embodiment can group invitees based on their shared interest in the offering's activity type (from their profile information) and their availability to attend the event (based on free/busy times stored for each registered user as provided by the calendar module 14E). In this embodiment of the event planning module, the invitees are categorized as interested and available friends, interested but not available friends, and available but interest-uncertain friends. For the group of interested but not available friends, the host can also simultaneously review the free/busy time corresponding to selected 'interested but not available friends', against the event date/time schedule and alter the event schedule if desired. In accordance with the present disclosure, the event planning module 14 further includes a behavior analysis module 14F configured to calculate a probability score corresponding to each of the users included in the invitee list prepared by the search module 14D. The probability score allotted to each invitee indicates a probability that the invitee would accept the event invitation if invited based on analyzing data related to invitee's current plans, behavioral pattern, invitee's response to previous event plans and events hosted by the user. In accordance with the present disclosure, the invitee list prepared by the search module 14D is arranged in descending level of the probability score associated with each of the invitees in order to help the host determine which invitees are more likely to accept the invitation for the particular event and use it as a guide to further edit the invitee list.

In another embodiment, the event planning module is implemented as an optimization-based planner. In this embodiment the host can provide input on optimization objective function and any event plan parameter constraints. The output of the event planning module can be in the form of a set of pre-designed event plans specifying the event schedule, event catalog offering, and event invitee list. The host can then choose one of these event plans to execute.

The social networking platform 100, in accordance with the present disclosure includes an invitation module 16. The invitation module 16 cooperates with the event planning module 14 and selectively transmits invitations to invitees selected by the host from the invitee list, inviting them to attend the event. The invitation module 16 is further adapted to track RSVP responses (to the invitation) provided by the invitees. An invitee can respond to an invitation in a variety of ways and in one embodiment, the invitee responds by accepting it, declining it, or tentatively accepting it. Invitees can also provide their comments and other information to the host while responding to the invitation.

In accordance with the present disclosure, the event planning module 14 further includes a calendar module 14E accessible to each of the registered users. Every registered user has access to at least one instance of the calendar module. The calendar module 14E also has access to one or more event-related information repository instances associated with a registered user and physically located in a federated manner across one or several servers. The calendar module 14E cooperates with one or more instances of the third repository 13 to query and receive the event related information corresponding to each of the registered users. The calendar module 14E is further configured to map the event related information corresponding to each of the users against the calendar dates and times and generate an event schedule in the calendar corresponding to each of the registered users.

The calendar event schedule created by the calendar module 14E also includes other event related information such as the time schedule and location of the event. The calendar's event schedule can be displayed at various levels of time granularity including hourly basis, daily basis, weekly basis, and monthly basis. The calendar module 14E also responds to queries about the free time/busy time of a registered user, by analyzing the user's event schedule information.

In accordance with the present disclosure, the invitation module 16 is further configured to generate an open choice invitation with a limited number of choices provided to the invitees regarding catalog offerings and related time/date schedules. The invitation module 16 elicits invitees' preferences for specific catalog offerings and/or time schedules. This information when presented to the event host can help in selecting and finalizing event related information.

In accordance with the present disclosure, the request to plan an event can be generated from within a vendor's website or event newsletter instead of from within the social networking platform 100. In one embodiment, a third party resource such as vendor's website includes a widget that is configured to gather the event planning context information from the third party resource and communicate this event planning context information to the social networking platform 100, for an event to be planned around the selected catalog offering.

In accordance with the present disclosure, the event planning module 14 is further configured to enable registered users to communicate their interest and availability to attend an event (also referred to as 'open-door') to be hosted by another registered user who is included in their friend list and in the case where the event plan mentions that others can request an event invitation if interested.

In accordance with the present disclosure, one embodiment of the event planning module 14 enables a user (host) to start planning an event by selecting a set of users to create a group whom he/she wishes to invite for the event. The host is provided with a display of the names of friends who he/she wishes to invite to the event. The names of the users displayed can include the entire set of friends or a subset thereof based on user's current location and/or user's specific interests. The host further selects an appropriate date and time to host an event. Thereafter, the calendar module 14E is accessed to determine the free/busy time of each user in the group, host included. The host may then select a date and time for the event that is convenient to all the users in the group or that is convenient to at least a sub-set of users in the group. The host selects at least one user from the aforementioned group via a second selection module (not shown in figures) and invites them to be a part of the event. Further, once the date and time of the event are fixed, the host accesses a third selection module (not shown in figures) to select at least one catalog offering around which the event can be planned. Additionally, the host is also provided with the probability score corresponding to each of the users who have been invited for the event, indicating the probability that the invited user will accept the host's event invitation.

In accordance with the present disclosure, one embodiment of the event planning module 14 also enables a user to start planning an event by selecting a preferred date and time for the event on his/her calendar. For the selected date and time, the host is shown a list of catalog offerings (from the ones stored in repository 12) that match with the selected date and time. For each of the displayed catalog offerings, the host is also shown the number of users who are interested in the event's activity and available to join the event (as per their respective event schedules depicted on their respective calendars). The host is guided to select one catalog offering using the third selection module. Further, the host makes use of the second selection module to select the users who are interested and available to attend the event. Additionally, the host is also provided with the probability score corresponding to each of the users who have been invited for the event, the probability score indicating the probability that the invited user will accept the host's event invitation.

In accordance with the present disclosure, the social networking platform 100 further includes a recommendation module 18 configured to generate a plurality of recommendations corresponding to catalog offerings based on the behavioral patterns, preferences, and profile information corresponding to the users. The recommendation module 18 allots grades to the catalog offerings stored in the second repository 12 based on at least the offering type, offering size, offering location, offering content, offering timing, number of event(s) associated with the catalog offering, popularity of the catalog offering and cost associated with the catalog offering. The catalog offerings are graded by the recommendation module 18, typically by analyzing the users' profile and preference settings stored in first repository 10, and also based on the registered user's current event schedule stored in the third repository 13. Typically, the user preference includes but is not limited to preferred time schedule(s) for social activities on various days of the week and user's current location or user's home location. The recommendation module 18 recommends catalog offerings to registered users based on the user's current location as set by the user in the user's preference information.

In accordance with the present disclosure, a user can also announce his/her interest in attending an event of certain activity type(s) and/or event involving certain catalog offering(s) and at a preferred date and time (referred to as 'open-interest'). The user also selects friends from whom receiving an event invitation is desired. The event planning module 14 is further configured to notify other registered users in the user's friend list regarding the interest announced by the user. The user's friends are provided with the option of responding to the aforementioned notification and to invite the user who has made the announcement, along with other users to the hosted event.

In accordance with the present disclosure, the invitation module 16 further includes an event invitation management module 16A which cooperates with the event planning module 14 to enable users to manage the invitations for events they are hosting or the events to which they are invited. The event invitation management module 16A is responsible for generating the event invitations based on the essential event plan parameters including selected catalog offering, invitee list, event date and time schedule, and privacy settings for sharing event-related data. The event invitation management module 16A also enables the user/host to manage the invitee list by selecting users from the invitee list and adding or deleting users to the event's invitee list, changing the catalog offering information, editing the event's time schedule, event description, and the like. The invitation module 16 enables the host to include non-members as authorized-users as a part of the event invitee list by including their names and communication details such as contact number or email. After the creation of the invitee list, the invitation module 16 sends invitations to the invitees using their preferred communication mode including but not limited to email, SMS message sent to invitee's communication device such as mobile phone, messages sent to the invitee's account in third party resources such as Facebook, LinkedIn, Twitter and the like. The event invitation includes a link back to the social networking platform 100 so that invitees can respond to the invitation by accepting, declining, or tentatively accepting the invitation.

In case the invitee is a non-registered user of the social networking platform 100, he/she is enabled to provide a response without having to become a registered user of the platform 100. The invitees who are registered users of the platform 100 can provide their responses to the invitation by logging into their respective user accounts.

In accordance with the present disclosure, the event invitation management module 16A tracks, manages and reports the invitee responses to the event invitations. The host has the privilege to edit event related information such as the event title, add comments, set the RSVP deadline, and select the background image template for the event invitation. If the host wishes to change the event plan including selected event date and time and catalog offering, he can do so by deleting the event plan and subsequently generate a new event plan based on the new parameters. Additionally, the event invitation being the social wall for the planned event can be used by host and other users to communicate event-related comments if allowed based on the access privileges and action permissions (privacy settings) for the specific event invitation.

In accordance with the present disclosure, the invitation module 16 enables the host to specify the size of the invitee list. The size of the invitee list is provided to indicate the minimum and the maximum number of friends/affiliates/users who can participate in the event. If the minimum number of users required for the event is not satisfied, then that event could be cancelled. In case if the maximum number of users required for the event as indicated by the host is satisfied, then the option of accepting the event invitation is deactivated for later invitees. Further, the invitation module 16 enables host to indicate a second limit that is the number of guests that an invitee can bring along with himself. If no guests are allowed, then the host can specify the number of guests to be equal to zero. The invitees can indicate the number of accompanying guests in their invitation response.

In accordance with the present disclosure, if the invitation-type is an open choice invitation, the invitation module 16 generates invitations with a limited number of choices provided to the invitees regarding catalog offerings and related date & time schedules. The preference for offerings and schedule as provided by the host are displayed in case of the open-choice invitation. The invitee can check his preference for catalog offering and related date & time schedule at the time of registering his response for the event. In addition, the invitee is also provided with the option to write-in his preference for other catalog offerings and preferred date & time schedule. The invitee response including invitee's preferences are collected and a choice-poll statistics displayed as a part of the invitation response for the benefit of the host and other invitees. The poll data enables the host to judge the sentiment of the invitees. But the host has the option that he may or may not consider the poll statistics in deciding the final choice of the catalog offering and the related date & time schedule for the event.

In accordance with the present disclosure, if the invitation-type is an open-door invitation, the invitation module 16 generates invitations, where invitations may also be displayed to a subset of non-invited friends (users). The non-invited friends (users) have the privilege for sending a request to the host and express their interest to attend the event. The open-door status of the invitation remains active on the platform until the maximum number of users as indicated by the host is reached, after which the event invitation is no longer displayed as an open-door invitation so no additional requests for attending the event may be sent. For example, these type of invitations are useful when the host wants to go hiking with specific friends/users but has no objections in allowing a limited number of other friends to join in the event. In this case, the host is notified of the non-invited friend's interest and further, can proceed to add the non-invited friend to the event invitee list by accepting their request for attending the event.

In accordance with the present disclosure, the event invitation module 16 can enable a pencil-in invitation wherein the invitee (registered user) has granted friends (registered users) appropriate permissions to create an event entry directly in the invitee's event calendar. Any user can selectively create a 'pencil-in' friend list by selecting a group of friends from whom the user is willing to accept a pencil-in invitation. When a user creates a 'pencil-in' event entry on their invitee's calendar, the transaction adds the event to both the user and invitee's calendars simultaneously, and the user who created the pencil-in invitation is displayed as the event-host in such a situation. The event time period also displays busy on both the user and the invitee's calendars to avoid double-booking and the invitee's invitation response status is initially displayed as "no response". The invitee is informed of the friend's pencil-in event entry by receiving messages in his mail-box, or on his communicating device such as mobile phone. The invitee can respond to the invitation by selecting an option from the group consisting of accept, decline, and tentatively accept and the event-host is informed about the updated response from the invitee to the pencil-in event entry.

In accordance with the present disclosure, the responses of each invitee to the event invitation are registered as part of the event related information, by the event invitation module 16 and access privileges and action permissions to view and edit this information is granted by the host by modifying the event's data sharing privacy policies. The event related information includes the event title, description, host, date/time, catalog offering and related information, invitee list, invitee responses, and event-related social media such as comments, photos, and the like.

In accordance with the present disclosure, the social networking platform further includes an analytic engine 20 cooperating with repository 10, repository 12, and repository 13 and configured to analyze the historical behavioral information corresponding to users (captured in event-related information) available in repository 13. The analytic engine 20 further identifies behavioral patterns underlying the behavioral information associated with users and stores/updates the users' behavioral patterns in repository 10 from where it can be accessed as an input to the recommendation module 18. The recommendation module 18 makes use of the behavioral patterns along with the user preferences and profile information from repository 10 to generate and transmit appropriate catalog offering (stored in repository 12) recommendations to users. Some of the behavioral patterns identified by the analytics engine 20 are exemplified below:

User A prefers to attend movies with Friend B if the movie genre is Thrillers. This insight can be used when recommending movies to User A when he wants to do something with Friend B. It can also be used to recommend that Friend B be invited when User A wants to attend a movie of the Thriller genre;

User A is likely to attend events organized by Friend C if common Friend B is also invited. This insight can be used while creating the invitee list for Friend C's event;

User A will likely not accept any invitation for restaurant dining if restaurant is located in a specific neighborhood in a specific town. This insight can be used when recommending restaurants when User A is in the invitee list; and User B will likely not accept an invitation to restaurant dining if the restaurant cuisine is French. This insight can be used when recommending restaurants when User B is in the invitee list.

Further, the analytic engine 20 also analyzes the offerings, ratings/feedbacks corresponding to vendors/catalog offerings and provides business-related patterns to the registered vendors. Some of the vendor related patterns identified by the analytical engine 20 are exemplified below:

Restaurant Vendor A has below average ratings from members who prefer vegetarian food. Vendor A can use this information to design a menu that is vegetarian-friendly;

Restaurant Vendor A serves an area with high percentage of children below 5 years age. Vendor A can use this information to design a menu that is kid-friendly; and Vendor B's coupons offer below average discount in comparison to competition for food-items but above average for drinks. Vendor B can use this information to decide how best to design the discount schedule for its offerings.

In accordance with the present disclosure, each event invitation created via the social networking platform 100 includes a section for attaching event-related social media including comments, discussion threads, images, videos, music files, and the like. Users and their affiliates have access to various items of social media for viewing, adding, editing, and deleting content depending on the event's access privileges and action permissions specified by the event's host. Hosts have access privileges and all action permissions on the event they are hosting. One embodiment of the present disclosure provides Users and their affiliates with appropriate access privileges and action permissions to share elements of the event-related information including social media with friends on other social networks such as Facebook, Google+, and the like that are outside the social networking platform 100. In such instances, appropriate content and/or URL links to the content is published on behalf of the sharing user on their social network site and made visible to their friends in the external social networks under the external social network's access privileges and permissions specified in the user's external social network profile. The members of these outside social networks can be non-members of the social networking platform 100 in which case they are considered anonymous users. All items published by a user in such manner now has a life of its own on the external social network and external users can view, comment, and share the event-related content according to the privileges and permissions of the external social network.

In accordance with the present disclosure, the social networking platform 100 includes a monetization module denoted by the reference numeral 24. The monetization module 24 implements a variety of models using which revenue is collected from registered vendors including membership fee, and referral fee when a vendor's offering is included in an event plan (pay per attendee). Variants of this model can be in the form of (1) fixed fee per attendee depending on offering category, (2) variable fee per attendee based on an auction model wherein vendors bid against each other to appear in top section of offering list during event planning, (3) variable fee per attendee depending on user traffic patterns with low traffic days being charged higher than high traffic days.

In accordance with the present disclosure, The monetization module 24 also provides paid packages for variety of features including automatic event reservations, ticket purchase, performance calendar integration, and the like. The monetization module 24 is interfaced with a payment-gateway 24A to facilitate users to pay for the services availed via the platform 100. Users can at least purchase the offerings posted by the vendors, reserve a place for themselves at any of the event organized via the platform 100 and pay online for the same using the payment-gateway 24A. The payment-gateway 24A provides users with payment options including but not restricted to payment by credit card, debit card, internet banking, electronic check, and other forms of electronic payment. For example, a user (host) creates an event involving watching movie at a cinema hall and sends invitations to his ten friends. The host has the option to purchase and reserve offerings posted on the platform 100 and selected in the event plan using the payment-gateway 24A as per his requirement. The user (host) need not access a separate platform or pay at a counter of the cinema hall. Instead he can purchase the movie tickets online and pay for the same using the payment gateway 24A. The payment-gateway 24A further reduces the user's time in planning and managing the desired event and provides a mechanism to carry out a secure, seamless transaction on the platform 100.

In accordance with the present disclosure, The social networking platform 100 also provides for discount coupons to be sold to users, which are redeemable across all the vendors registered with the social networking platform 100. For example, user buys $30 discount coupon for $25 to pay vendor. This $25 payment gets divided into $20 for vendor and $5 for the operator of the event-centric social networking site. Further, the monetization module 24 collects revenue from advertisers (typically vendors) when user clicks on vendor's advertisements displayed in a context-aware manner. The amount paid per click can be decided based on vendors bidding against each other to appear in top section of advertisement space. Further, instead of implementing one's own advertisement mechanism, one can provide a space to other advertisement agencies on the website and get paid a prenegotiated amount per click and the like. The monetization module further collects a pre-determined amount of fee for sponsored vendor listings displayed to all users on the social networking platform.

In accordance with the present disclosure, the platform 100 includes an editor (not shown in figures) configured to enable users to edit their preferences including preferred time schedule for a plurality of activities including social activities and work-related activities, cost/budget associated with said activities, favorite catalog offerings corresponding to said activities. The editor also enables users to set default values for social activity times and work-related activity times scheduled for the days of the week, on their respective instances of the calendar module 14E.

The social networking platform 100 further includes an activity-editor (not shown in figures) configured to enable users to define new activities and notify other users through the notification module 11 about the newly created activities. The activity-editor also provides for other users to copy the newly created activities into their respective activity lists in their profiles.

In accordance with the present disclosure, the social networking platform 100 further includes a privacy editor (not shown in figures) which enables users to edit their data privacy preferences in the form of access privileges and action permissions assigned to various user roles, including self, event host, event attendee, event invitee, friend of a user, public user and anonymous user, in respect of at least users' registration information, user event related information and user's calendar related information.

In accordance with the present disclosure, the social networking platform 100 includes a presentation module 17 configured to display, to the users, a list of event invitations including past events and the events planned for the future. The presentation module 17 also controls user's access to the list of event invitations. The presentation module 17 also provides users with selective access to the contents of each listed event invitation for the purpose of viewing, editing, commenting, adding photos and social media files.

In accordance with a second embodiment of the present disclosure, the social networking platform 100 of the present disclosure is also configured to be accessed and operated from a mobile electronic device such as a smart phone, mobile phone, tablet PC, in the form of a mobile application or a mobile agent. In accordance with this embodiment, several features that are salient to mobile devices including video and audio recording capability and location awareness are used to automate and improve capabilities of the social networking platform 100 envisaged in the first embodiment. For example, in the second embodiment, the images, video, and audio files that a user/visitor wishes to attach to event invitations can be either pre-existing on his/her mobile device or can be created and attached directly from the mobile device in real-time. Similarly, a user's current location information, stored as part of the user preference information can be updated in real-time through the real-time location awareness capability available in mobile devices.

In addition to the functionalities described above, all the functionalities described in the first embodiment of the present disclosure are available to the user accessing the social networking platform 100 from a mobile electronic device.

Figure 2A:
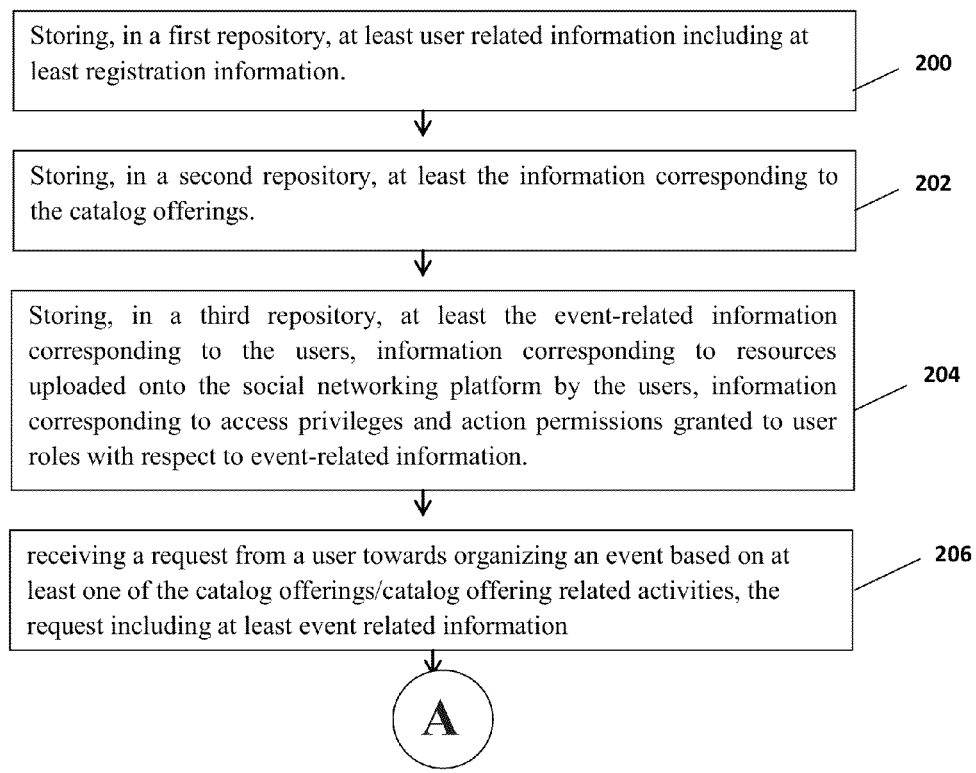
FIG. 2A and FIG. 2B illustrate a method for implementing an event-centric social networking platform, in accordance with the present disclosure.
Figure 2B:
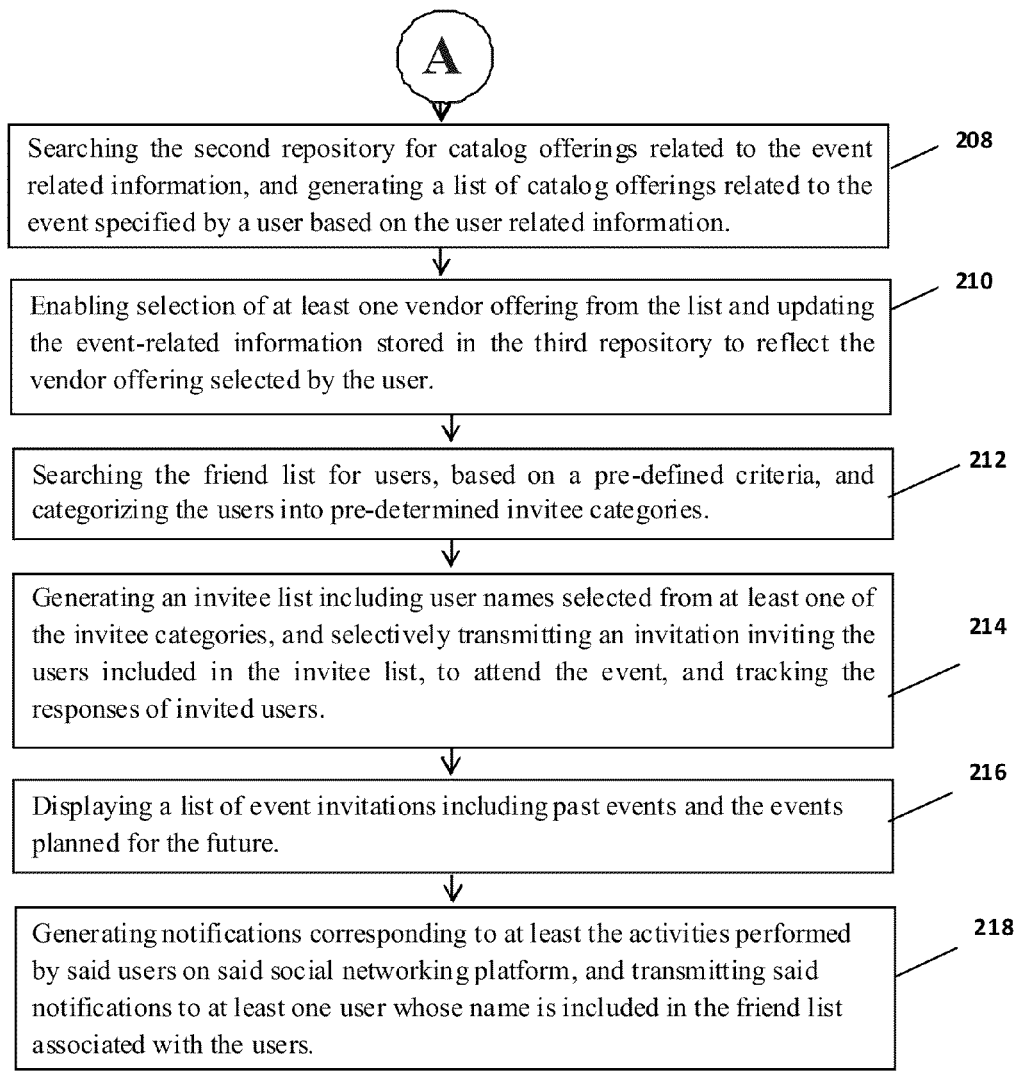

Referring to FIG. 2A and FIG. 2B, a method for implementing an event-centric social networking platform is illustrated through flow diagrams. The method envisaged by the present disclosure includes the following steps:

storing, in a first repository, at least user related information including at least registration information 200;

storing, in a second repository, at least the information corresponding to the catalog offerings, information related to the ratings allotted to the vendors/catalog offerings by the users 202;

storing, in a third repository, at least the event-related information corresponding to the users, information corresponding to resources uploaded onto the social networking platform by the users, information corresponding to access privileges and action permissions granted to user roles with respect to event-related information 204;

receiving a request from a user towards organizing an event based on at least one of the catalog offerings/catalog offering related activities, the request including at least event related information 206;

searching the second repository for catalog offerings related to the event related information, and generating a list of catalog offerings related to the event specified by a user based on the user related information 208;

enabling selection of at least one vendor offering from the list and updating the event-related information stored in the third repository to reflect the vendor offering selected by the user 210;

searching the friend list for users, based on a pre-defined criteria, and categorizing the users into pre-determined invitee categories 212;

generating an invitee list including user names selected from at least one of the invitee categories, and selectively transmitting an invitation inviting the users included in the invitee list, to attend the event, and tracking the responses of invited users 214;

displaying a list of event invitations including past events and the events planned for the future 216; and generating notifications corresponding to at least the activities performed by said users on said social networking platform, and transmitting said notifications to at least one user whose name is included in the friend list associated with the users 218.

In accordance with the present disclosure, the step of storing, in a first repository, at least user related information, further includes the step of storing at least registration information, user interests related information, user skill related information, user location information, user availability preference related information, users' behavioral patterns, a friend list having names of users who are affiliated to a particular user, and information corresponding to messages sent/received by said users to/from other users.

In accordance with the present disclosure, the step of storing in a second repository, at least the information corresponding to the catalog offerings, further includes the step of storing the information related to the ratings allotted by said users to said vendors/catalog offerings, and information corresponding to the vendors/catalog offerings-related reviews/feedbacks generated by said users.

In accordance with the present disclosure, the step of storing, in a third repository, at least the event-related information corresponding to said users further includes the step of storing event related information including at least the information corresponding to the events organized by users based on at least one of said catalog offerings and the custom events organized by said users independent of said catalog offerings.

In accordance with the present disclosure, the step of analyzing, using an analytic engine, said users' behavioral information and identifying behavioral patterns underlying said users' behavioral information, further includes the step of analyzing the offerings, ratings/feedbacks corresponding to said vendors.

In accordance with the present disclosure, the step of displaying a list of event invitations including past events and the events planned for the future, further includes the step of controlling users' access to said list of event invitations, providing users with selective access to the contents of the event invitations, enabling said users to view the event invitation, edit the event invitation, comment on the event invitation and add image/social media files on to the event invitation.

In accordance with the present disclosure, the method further includes the step of generating notifications corresponding to at least the activities performed by the users on the social networking platform, and transmitting the notifications to at least one user whose name is included in the friend list associated with the user performing the activity.

In accordance with the present disclosure, the method further includes the following steps:
- analyzing, using an analytic engine, the users' behavioral information in the third repository and identifying behavioral patterns underlying the users' behavioral information, and analyzing the offerings, ratings/feedbacks corresponding to the users registered as vendors; and
- generating a plurality of recommendations corresponding to the catalog offerings based on user behavioral patterns identified by the analytic engine and further based on user interests related information and user preference information stored in the first repository, and transmitting the recommendations to the users.

In accordance with the present disclosure, the step of receiving a request from a user towards organizing an event, further includes the following steps:
- receiving a request from a user towards organizing an event based on at least the free time schedule corresponding to said user, wherein said request includes at least event related information; and
- receiving a request from a user towards organizing an event based on the availability of at least one friend thereof, wherein said request includes at least the event related information.

In accordance with the present disclosure, the step of searching said friend list for users, based on a pro-defined criteria, further includes the following steps:
- searching the friend list stored in said first repository for friends interested and available for attending a planned event;
- searching the friend list stored in said repository for friends interested in attending a planned event; and
- searching the free time and busy time schedule related information stored in said first repository to extract a free time schedule common to each of the users interested in attending a planned event.

In accordance with the present disclosure, the step of enabling selection of at least one catalog offering, from said list includes the following steps:
- enabling selection of a catalog offering based on the free time schedule common to each of the users interested in attending a planned event; and
- enabling selection of a catalog offering based on the friends interested and available for attending a planned event.

In accordance with the present disclosure, the method further includes the step of calculating a probability score corresponding to each of the users included in said invitee list, wherein said probability score indicates the probability that each of the users included in said invitee list would accept said event invitation if invited, and using the probability score as a guide to further edit the invitee list.

In accordance with the present disclosure, the step of selectively transmitting an invitation inviting the users included in said invitee list further includes the steps of including registered invitees and non-registered invitees within the invitee list, transmitting invitations to the registered/non-registered invitees in said invitee list, and enabling said registered/non-registered invitees to respond to the event invitation.

In accordance with the present disclosure, the method further includes the following steps:
- providing every user with access to at least one instance of a calendar; and
- receiving event related information corresponding to each of the users, and generating an event schedule corresponding to each of said users, and populating said calendar instance with said event schedule; and
- determining the free time/busy time corresponding to each of the users based on the event related information corresponding to each of the users.

In accordance with the present disclosure, the step of categorizing said users into pre-determined invitee categories further includes the following steps:
- searching said instances of the calendar to identify the users free to attend an event planned by a user, and
- updating said invitee list to indicate the names of users free to attend said event and the names of users not available for attending said event.

In accordance with the present disclosure, the method further includes the step of configuring said social networking platform to cooperate with third party applications including websites and newsletters to enable said users to generate a request for organizing an event via said third party applications.

In accordance with the present disclosure, the step of enabling selection of at least one catalog offering, from said list, further includes the following steps:
- enabling a host user to select a user from said friend list for the purpose of planning an event, and extracting the appropriate free time schedule corresponding to the selected user(s), based on the event related information corresponding to the selected user(s);
- searching for catalog offerings including activity types supporting host user's interests, host user's free time, interests shared between the host user and selected user; and
- selecting at least one catalog offering based on the appropriate date and time schedule selected by the host user.

In accordance with the present disclosure, the step of generating a plurality of recommendations further includes the step of grading the catalog offerings stored in the second repository based on the preference settings, behavioral information and interests of users.

In accordance with the present disclosure, the method further includes the following steps:
- enabling users to edit their preferences including preferred time schedule for a plurality of activities including social activities and work-related activities, cost/budget associated with said activities, favorite catalog offerings corresponding to said activities;
- enabling said users to set default values for social activity times and work-related activity times scheduled for the days of the week, on their respective instances of the calendar.

In accordance with the present disclosure, the method further includes the following steps:

enabling said users to announce their availability for event participation during a specific time period, their interest towards attending an event based on specific catalog offerings, one or more activity types associated with said catalog offerings, and their preference of friends from whom said user wishes to receive event invitations in response to their announced interest; and notifying other users present in said user's friend list of the announcement should said user wish to invite said announcer and other users to a planned event.

In accordance with the present disclosure, the step of searching said friend list for users, based on a pre-defined criteria, and categorizing said users into pre-determined invitee categories, further includes the following steps:

extracting the profile of every user included in said friend list;

determining, based on the extracted profile, the pre-determined invitee category into which each of said users are to be categorized; and categorizing said users into the pre-determined invitee categories, and updating said invitee list In accordance with the present disclosure, the step of providing every user with access to at least one instance of a calendar further includes the following steps:

integrating multiple event-related information sources corresponding to a user;

generating an aggregated list comprising event-related information from multiple sources including social event related information and work related information;

displaying said aggregated list; and populating calendar with event-related information corresponding to said user.

In accordance with the present disclosure, the method further includes the step of enabling said users to communicate their interest and availability to attend an event hosted by a user included in said friend list, in said event that said user indicates that other users can request invitation to the event.

In accordance with the present disclosure, the method further includes the step of generating an open choice invitation with a limited number of choices provided to the invitees regarding catalog offerings and related time/date schedules.

In accordance with the present disclosure, the method further includes the step of enabling a user having appropriate access privileges and action permissions to enter an event invitation on friends' calendar, said event invitation initially in a no-response state and configured to be subsequently changed into an accepted state, declined state or tentatively accepted state, by the invited friend(s).

In accordance with the present disclosure, the method further includes the step of enabling users to edit their data privacy preferences in the form of access privileges and action permissions assigned to various user roles, including self, event host, event attendee, event invitee, friend of a user, public user and anonymous user, in respect of at least users' registration information, user event related information and users' calendar related information.

In accordance with the present disclosure, the method further includes the step of automatically generating event plans based on at least the available catalog offerings, user's friend list, preferences and interests of users and friends thereof, behavioral information corresponding to the users and friends thereof and free/busy time schedules extracted from the calendar instances of users and friends thereof.

TECHNICAL ADVANCEMENTS

The technical advancements of the event centric social networking platform as envisaged by the present disclosure include the realization of:

an event centric social networking platform;

a platform that can be utilized for event planning;

a platform for sharing event related content with the users and users registered with other third party resources;

a platform that enable users manage the events on a calendar;

a platform that provide pre-configured event plans based on users' interests and calendar availability;

a platform that provide analytics on users behavior;

a platform to facilitate vendor users to submit catalog offerings;

a platform that suggests catalog offerings based on user interests related information and event plan related information; and a social networking platform that is based on a revenue model.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An event-centric computer-implemented social networking platform, said social networking platform accessible to users via a computer network, said social networking platform comprising:

a first repository configured to store at least user related information;

a second repository configured to store the information corresponding to catalog offerings;

a third repository configured to store at least event-related information corresponding to said users, information corresponding to resources uploaded onto a social networking platform by said users, information corresponding to access privileges and action permissions granted to respective users;

an event planning module accessible to said users, said event planning module comprising:

a receiving module configured to receive a request from a user towards organizing an event based on at least one of catalog offerings related activities/catalog offerings, said request including at least event related information;

a first search module configured to search said second repository for catalog offerings related to said event related information, said first search module further configured to generate a list of catalog offerings related to event specified by a user based on user related information;

a first selection module configured to enable selection of at least one catalog offering, from said list of catalog offerings;

an updating module cooperating with said third repository, said updating module configured to update the event-related information stored in said third repository;

a second search module cooperating with said first repository and third repository, said second search module configured to search friend list for users, based on a pre-defined criteria, said second search module configured to categorize users in search result into pre-determined invitee categories;

an invitation module cooperating with said event planning module and configured to generate an invitee list for an event including user names selected from at least one of said pre-determined invitee categories and non-registered invitees, said invitation module configured to selectively transmit an invitation inviting users included in said invitee list to attend said event, said invitation module further configured to receive and track the responses of invited users; and a presentation module accessible to users, said presentation module configured to display a list of event invitations including past events and the events planned for future dates, said presentation manager configured to control users' access to said list of event invitations, said presentation manager configured to provide users with selective access to contents of a listed event invitation, said presentation manager further configured to enable said users to view the listed event invitation, edit the listed event invitation, comment on the listed event invitation and add photos/social media files on to the listed event invitation;

a notification module configured to generate notifications corresponding to activities performed by said users on the social networking platform, said notification module further configured to transmit notifications to other users included in the friend list associated with said users.

2. The social networking platform as claimed in claim 1, wherein:

said first repository is configured to store user related information including at least registration information, user interests related information, user availability preference related information, users' behavioral patterns, user skill related information, user location information, a friend list having names of users who are affiliated to a particular user, and information corresponding to messages sent/received by said users to/from other users; and said second search module is configured to search a user's friend list for other users interested in activities associated with said event, said second search module configured to categorize said users into pre-determined invitee categories including friends interested and available category, friends interested but not available category and friends available but interest uncertain category.

3. The social networking platform as claimed in claim 2, wherein the second search module is configured to search a user's friend list for other users interested in activities associated with said event and possessing a specific level of skill for performing the activity, said second search module configured to categorize said users into pre-determined invitee categories including friends interested and available category, friends interested but not available category and friends available but interest uncertain category.

4. The social networking platform as claimed in claim 1, wherein said third repository is configured to store event related information including at least the information corresponding to events organized by users based on at least one of said catalog offerings and custom events organized by said users independent of said catalog offerings.

5. The social networking platform as claimed in claim 4, wherein said third repository is further configured to allow an organized event to be associated with a plurality of other organized events in a variety of relationship arrangements including at least parent-child relationship and peer-to-peer relationship.

6. The social networking platform as claimed in claim 1, wherein said receiving module is further configured to:

receive a request from a user towards organizing an event based on at least the free time schedule corresponding to said user, wherein said request includes at least event related information; and receive a request from a user towards organizing an event based on the availability of at least one friend thereof, wherein said request includes at least the event related information.

7. The social networking platform as claimed in claim 1, wherein said second search module is configured to:

search friend list stored in said first repository for friends interested and available for attending a planned event;

search the friend list stored in said first repository for friends interested in attending a planned event; and search free time and busy time schedule related information stored in said third repository to extract a free time schedule common to each of the users interested in attending a planned event.

8. The social networking platform as claimed in claim 1, wherein said first selection module is further configured to:

enable selection of a catalog offering based on the free time schedule common to each of the users interested in attending a planned event; and enable selection of a catalog offering based on friends interested and available for attending a planned event.

9. The social networking platform as claimed in claim 1, wherein said event planning module further comprises a calculator configured to calculate a probability score corresponding to each user included in said invitee list, wherein said probability score indicates the probability that the user included in said invitee list, would accept said event invitation if invited.

10. The social networking platform as claimed in claim 1, wherein said platform further comprises an analytic engine cooperating with said first repository, second repository and third repository, said analytic engine configured to analyze users' behavioral information in the third repository and identify behavioral patterns underlying said users' behavioral information.

11. The social networking platform as claimed in claim 10, wherein said platform further comprises a recommendation module cooperating with said second repository and said analytic engine, said recommendation module configured to generate a plurality of recommendations corresponding to the catalog offerings based on user behavioral patterns identified by said analytic engine, and further based on user interests related information and user preference information stored in said first repository, said recommendation module configured to transmit recommendations to said users.

12. The social networking platform as claimed in claim 1, wherein said platform further comprises a calendar module accessible to each of the users, said calendar module having a plurality of instances of a calendar, wherein every user has access to at least one instance of said calendar, said calendaring module cooperating with said third repository to receive event related information corresponding to each of the users, said calendar module configured to generate an event schedule corresponding to each of said users and populate user's calendar instance with said event schedule, said calendar module still further configured to determine free time/busy time corresponding to each of the users based on the event related information corresponding to each of the users.

13. The social networking platform as claimed in claim 1, wherein said second search module cooperates with said calendar module, said second search module configured to search said instances of the calendaring module to identify the users free to attend an event planned by a host user, said second search module still further configured to update said invitee list to indicate names of users free to attend said event and to indicate the names of users not free to attend said event.

14. The social networking platform as claimed in claim 1, wherein said platform is configured to cooperate with third party applications including websites and newsletters to enable said users to generate a request for organizing an event via said third party applications.

15. The social networking platform as claimed in claim 1, wherein said event planning modules comprises:
- a second selection module configured to enable a host user to select a user from said friend list for the purpose of planning an event, said second selection module cooperating with said calendar module to extract the appropriate free time schedule corresponding to the selected user(s), based on the event related information corresponding to the selected user(s); and
- a third search module cooperating with the second repository to search for catalog offerings including activity types supporting host user's interests, host user's free time, interests shared between the host user and selected user; and
- a third selection module configured to select at least one catalog offering based on appropriate date and time schedule selected by the host user.

16. The social networking platform as claimed in claim 1, wherein said platform includes an editor configured to enable users to edit their preferences for a plurality of activities including preferred time schedule for social activities and work-related activities, cost/budget associated with said activities, favorite catalog offerings corresponding to said activities, said editor configured to enable said users to set default values for social activity times and work-related activity times scheduled for days of the week, on their respective instances of said calendar.

17. The social networking platform as claimed in claim 1, wherein said platform further includes an activity-editor configured to enable users to define new activities, said activity editor configured to enable said user to notify other users about the new activities, said activity-editor further configured to enable other users to copy the new activities into their respective activity lists.

18. The social networking platform as claimed in claim 1, wherein said event planning module is configured to enable said users to announce their availability for event participation during a specific time period, their interest towards attending an event based on specific catalog offerings, one or more activity types associated with said catalog offerings, said event planning module configured to enable user to express their preference of friends from whom said users wish to receive event invitations in response to their announcement, said event planning module still further configured to notify other users present in said user's friend list of the announcement should a notified user wish to invite announcing user and other users to a planned event.

19. The social networking platform as claimed in claim 12, wherein said calendar module is further configured to integrate multiple event-related information sources corresponding to a user, said calendar module further configured to generate an aggregated list comprising event-related information from multiple sources including social event related information and work event related information and to display said aggregated list corresponding to said user.

20. The social networking platform as claimed in claim 1, wherein said event planning module is further configured to enable said users to communicate their interest and availability to attend an event hosted by a user included in said friend list, if said event indicates that other users can request invitation to the event.

21. The social networking platform as claimed in claim 1, wherein said invitation module is further configured to generate an open choice invitation with a limited number of choices provided to invitees regarding catalog offerings and related time/date schedules.

22. The social networking platform as claimed in claim 1, wherein said platform is configured to enable a user having appropriate access privileges and action permissions, to enter an event invitation on friend's/friends' calendar(s), said event invitation initially in a no-response state and configured to be changed into an accepted state, declined state or tentatively accepted state, by the invited friend(s).

23. The social networking platform as claimed in claim 1, wherein said platform includes a privacy editor configured to enable users to edit their data privacy preferences in the form of access privileges and action permissions assigned to various user roles including self, event host, event attendee, event invitee, friend of a user, public user and anonymous user, in respect of at least users' registration information, user event related information and users' calendar related information.

24. The social networking platform as claimed in claim 1, wherein said event planning module is configured to automatically generate event plans based on at least the available catalog offerings, user's friend list, preferences and interests of users and friends thereof, behavioral information corresponding to the users and friends thereof and free/busy time schedules extracted from the calendar instances of users and friends thereof.

25. A computer-implemented method for implementing an event centric social networking platform, said method comprising the following steps:
- storing, in a first repository, at least user related information including at least registration information;
- storing, in a second repository, at least the information corresponding to catalog offerings;
- storing, in a third repository, at least event-related information corresponding to said users, information corresponding to resources uploaded onto a social networking platform by said users, information corresponding to access privileges and action permissions granted to user roles with respect to event-related information;
- receiving a request from a user towards organizing an event based on at least one of catalog offerings/catalog offering related activities, said request including at least event related information;
- searching said second repository for catalog offerings related to said event related information, and generating a list of catalog offerings related to event specified by a user based on user related information;
- enabling selection of at least one vendor offering from said list of catalog offerings and updating the event-related information stored in said third repository to reflect the vendor offering selected by said user;
- searching friend list for users, based on a pre-defined criteria, and categorizing users in search result into pre-determined invitee categories;
- generating an invitee list for an event including user names selected from at least one of said pre-determined invitee categories and non-registered invitees, and selectively transmitting an invitation inviting users included in said invitee list to attend said event, enabling said registered/non-registered invitees to respond to the event invitation, and tracking the responses of invited users; and displaying a list of event invitations including past events and the events planned for future dates, controlling users' access to said list of event invitations, providing users with selective access to contents of the event invitations, enabling said users to view the listed event invitation, edit the listed event invitation, comment on the listed event invitation and add image/social media files on to the listed event invitation;

generating notifications corresponding to at least the activities performed by said users on said social networking platform, and transmitting said notifications to at least one other user whose name is included in the friend list associated with the users.

26. The method as claimed in claim 25, wherein the step of storing, in a first repository, at least user related information, further includes the step of storing at least registration information, user interests related information, user skill related information, user location information, user availability preference related information, users' behavioral patterns, a friend list having names of users who are affiliated to a particular user, and information corresponding to messages sent/received by said users to/from other users.

27. The method as claimed in claim 25, wherein the step of storing in a second repository, at least the information corresponding to the catalog offerings, further includes the step of storing the information related to ratings allotted by said users to vendors/catalog offerings, and information corresponding to the vendors/catalog offerings-related reviews/feedbacks generated by said users.

28. The method as claimed in claim 25, wherein the step of storing, in a third repository, at least the event-related information corresponding to said users further includes the step of storing event related information including at least information corresponding to events organized by users based on at least one of said catalog offerings and custom events organized by said users independent of said catalog offerings.

29. The method as claimed in claim 25, wherein the step of receiving a request from a user towards organizing an event, further includes the following steps:
receiving a request from a user towards organizing an event based on at least the free time schedule corresponding to said user, wherein said request includes at least event related information; and
receiving a request from a user towards organizing an event based on the availability of at least one friend thereof, wherein said request includes at least the event related information.

30. The method as claimed in claim 25, wherein the step of searching said friend list for users, based on a pre-defined criteria, further includes the following steps:
searching friend list stored in said first repository for friends interested and available for attending a planned event;
searching the friend list stored in said repository for friends interested in attending a planned event; and
searching free time and busy time schedule related information stored in said first repository to extract a free time schedule common to each of the users interested in attending a planned event.

31. The method as claimed in claim 25, wherein the step of enabling selection of at least one catalog offering, from said list includes the following steps:

enabling selection of a catalog offering based on the free time schedule common to each of the users interested in attending a planned event; and
enabling selection of a catalog offering based on friends interested and available for attending a planned event.

32. The method as claimed in claim 25, wherein the method further includes the step of calculating a probability score corresponding to user included in said invitee list, wherein said probability score indicates the probability that the user included in said invitee list would accept said event invitation if invited, and using the probability score as a guide to further edit the invitee list.

33. The method as claimed in claim 25, wherein the method further includes the following steps:
providing every user with access to at least one instance of a calendar; and
receiving event related information corresponding to each of the users, and generating an event schedule corresponding to each of said users, and populating calendar instance with said event schedule; and
determining free time/busy time corresponding to each of the users based on the event related information corresponding to each of the users.

34. The method as claimed in claim 25, wherein the step of categorizing said users into pre-determined invitee categories further includes the following steps:
searching said instances of the calendar to identify the users free to attend an event planned by a host user; and
updating said invitee list to indicate names of users free to attend said event and the names of users not available for attending said event.

35. The method as claimed in claim 25, wherein the method further includes the step of configuring said social networking platform to cooperate with third party applications including websites and newsletters to enable said users to generate a request for organizing an event via said third party applications.

36. The method as claimed in claim 25, wherein the method further includes the step of analyzing, using an analytic engine, users' behavioral information in the third repository and identifying behavioral patterns underlying said users' behavioral information, and analyzing offerings, ratings/feedbacks corresponding to users registered as vendors.

37. The method as claimed in claim 25, wherein the method further includes the step of generating a plurality of recommendations corresponding to the catalog offerings based on user behavioral patterns identified by said analytic engine, and further based on user interests related information and user preference information stored in said first repository, and transmitting recommendations to said users.

38. The method as claimed in claim 25, wherein the step of enabling selection of at least one catalog offering, from said list, further includes the following steps:
enabling a host user to select a user from said friend list for the purpose of planning an event, and extracting the appropriate free time schedule corresponding to the selected user(s), based on the event related information corresponding to the selected user(s);
searching for catalog offerings including activity types supporting host user's interests, host user's free time, interests shared between the host user and selected user; and
selecting at least one catalog offering based on appropriate date and time schedule selected by the host user.

39. The method as claimed in claim 25, wherein the method further includes the following steps:

enabling users to edit their preferences for a plurality of activities including preferred time schedule for social activities and work-related activities, cost/budget associated with said activities, favorite catalog offerings corresponding to said activities;

enabling said users to set default values for social activity times and work-related activity times scheduled for days of the week, on their respective instances of the calendar.

40. The method as claimed in claim 25, wherein the method further includes the following steps:

enabling said users to announce their availability for event participation during a specific time period, their interest towards attending an event based on specific catalog offerings, one or more activity types associated with said catalog offerings, and their preference of friends from whom said user wishes to receive event invitations in response to their announcement; and notifying other users present in said user's friend list of the announcement should a notified user wish to invite announcing user and other users to a planned event.

41. The method as claimed in claim 25, wherein the step of searching said friend list for users, based on a pre-defined criteria, and categorizing said users into pre-determined invitee categories, further includes the following steps:

extracting profile of every user included in said friend list;

determining, based on the extracted profile, pre-determined invitee category into which each of said users are to be categorized; and categorizing said users into the pre-determined invitee categories, and updating said invitee list.

42. The method as claimed in claim 33, wherein the step of providing every user with access to at least one instance of a calendar further includes the following steps:

integrating multiple event-related information sources corresponding to a user;

generating an aggregated list comprising event-related information from multiple sources including social event related information and work related information;

displaying said aggregated list corresponding to said user.

43. The method as claimed in claim 25, wherein the method further includes the step of enabling said users to communicate their interest and availability to attend an event hosted by a user included in said friend list, if said event indicates that other users can request invitation to the event.

44. The method as claimed in claim 25, wherein the method further includes the step of generating an open choice invitation with a limited number of choices provided to invitees regarding catalog offerings and related time/date schedules.

45. The method as claimed in claim 25, wherein the method further includes the step of enabling a user having appropriate access privileges and action permissions to enter an event invitation on friend's/friends' calendar(s), said event invitation initially in a no-response state and configured to be subsequently changed into an accepted state, declined state or tentatively accepted state, by the invited friend(s).

46. The method as claimed in claim 25, wherein the method further includes the step of enabling users to edit their data privacy preferences in the form of access privileges and action permissions assigned to various user roles, including self, event host, event attendee, event invitee, friend of a user, public user and anonymous user, in respect of at least users' registration information, user event related information and users' calendar related information.

47. The method as claimed in claim 25, wherein the method further includes the step of automatically generating event plans based on at least the available catalog offerings, user's friend list, preferences and interests of users and friends thereof, behavioral information corresponding to the users and friends thereof and free/busy time schedules extracted from the calendar instances of users and friends thereof.

* * * * *